N. S. McNAB.
MODE OF AND MEANS FOR GRADING FRUIT AND OTHER ARTICLES.
APPLICATION FILED OCT. 7, 1919.
1,346,835. Patented July 20, 1920.
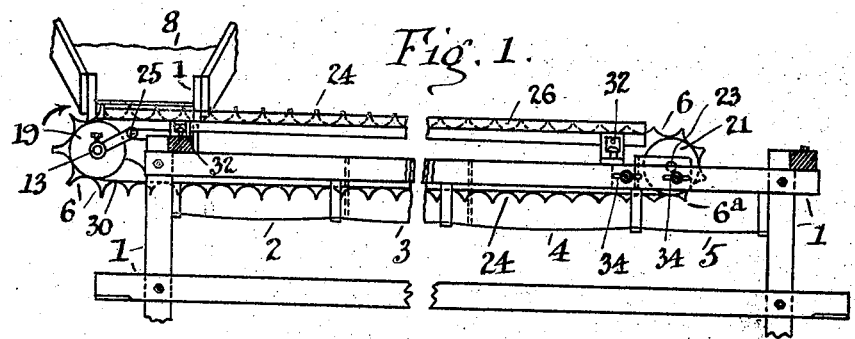
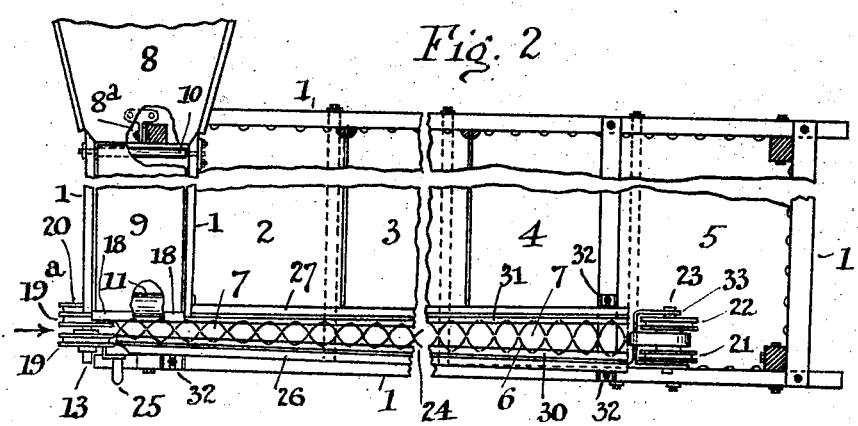
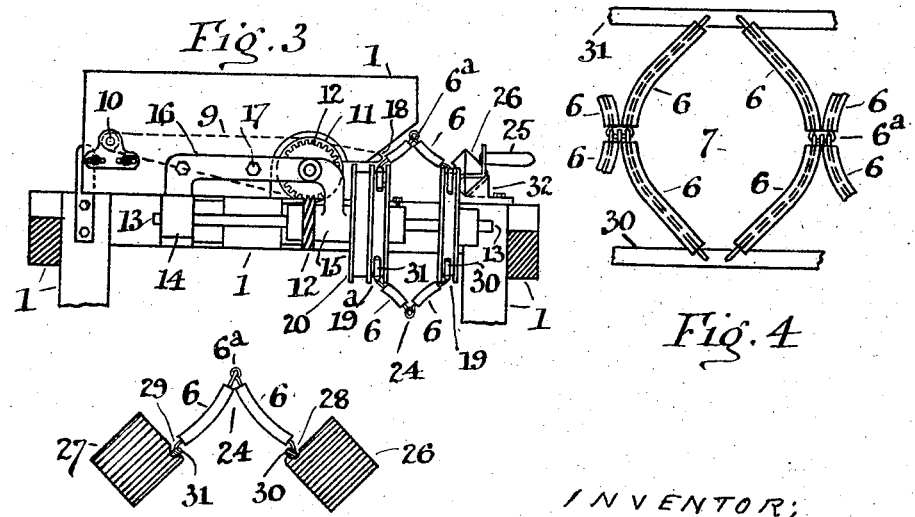

UNITED STATES PATENT OFFICE.

NORMAN SINCLAIR McNAB, OF MELBOURNE, VICTORIA, AUSTRALIA.

MODE OF AND MEANS FOR GRADING FRUIT AND OTHER ARTICLES.

1,346,835. Specification of Letters Patent. Patented July 20, 1920.

Application filed October 7, 1919. Serial No. 329,053.

*To all whom it may concern:*

Be it known that I, NORMAN SINCLAIR McNAB, a subject of the King of Great Britain and Ireland, etc., residing at 31 Queen street, Melbourn, in the State of Victoria, Commonwealth of Australia, have invented certain new and useful Improvements in Modes of and Means for Grading Fruit and other Articles; and I do hereby declare the following to be a full, clear, and exact description of the invention, such as will enable others skilled in the art to which it appertains to make and use the same.

This invention relates to a mode of and means for grading apples and other non-spherical fruit and other articles, especially soft fruits and the like which require to be treated gently to avoid injuring them and depreciating their value. Known machines have belts with grading holes of fixed sizes, but fruit becomes caught in the holes and bruised or otherwise damaged; other known machines have pairs of belts which diverge but will not properly grade such articles as flat apples.

My invention allows of grading either spherical or non-spherical articles including flat apples and without injury to articles which are soft.

I use carriers, belts or chains which have grading holes which automatically vary or change their openings according to the positions to which the parts of belts or chains which contain the said holes are moved.

The application of such belts or chains may be varied considerably but in the accompanying drawings (which are partly diagrammatic) parts are shown by way of example of one form of a machine having one such grading belt or chain. The details of construction may be varied by employing a plurality of such belts or chains while still retaining matter which is hereinafter claimed.

Figure 1 is a side view, Fig. 2 is a plan, Fig. 3 is an upper end view. Fig. 4 shows a piece of grading chain, and Fig. 5 is an end view of two links of the chain with sections of their side supports. The term chain will be used hereinafter for brevity although the part referred to contains in the case illustrated a belt at each side.

The grading chain 24 is not large enough in Figs 1 and 2 for its parts (which the other figures make clear) to be shown in detail. Its ends are omitted from Fig. 2, and some parts of this chain are omitted from Fig. 3. Such a machine will have any suitable frame 1, and any suitable means as compartments 2, 3, 4, 5 to receive graded articles according to their sizes at and above where they contact with the rims or seatings 6 of the grading holes 7 of the chain.

The machine will have any suitable feed means as a hopper or bin 8 (not shown in Fig. 3 but shown in Fig. 2 with a hinge support 8ª to allow of adjustment of slope of its base to regulate the feed) to receive fruit to be graded. The articles will be moved to the grading chain in any suitable manner as by a belt 9 which is carried around rollers 10, 11, which are suitably rotated as by worm gear 12 on a shaft 13 having bearings as 14, 15, supported as by a bracket 16 attached to the machine frame as by bolts 17. 18 is a lip or pad, which in some cases may be used, extending from over the belt edge to over the edge of the grading chain. The fruit or other articles thus become seated one in each chain seat and will stay in these seats until the latter spread out sufficiently to let the fruit drop through. As this spreading occurs gradually, the larger the seated article is the longer it will ride its seat while the chain is moved along.

The chain is moved as at one end over a pair of pulleys 19, 19ª on a shaft as 13, and at the other end over a pair of pulleys 21, 22 on shaft 23.

Any or all pulleys have when desired means of lateral adjustment on their shafts as by means of set screws in their hubs. It is desirable usually to provide in that way for locating one or each edge of the chain, to widen or narrow the seatings to suit the grading required.

I show one pulley as 19ª with an extension 20, which may receive a belt around it when it is desired to drive the chain and any other moving parts of the machine by power, but all power required may be imparted manually in many cases, and to allow of this I show a handle 25 attached to shaft 13.

The sides of the grading chain are supported and guided by diverging rails or in diverging channels so that as the sides move along they spread with the same divergence. These rails may be longitudinal bars 26, 27 with channels 28, 29 as seen in Fig. 5.

Each edge or side of the chain comprises belting, links, or some other arrangement of members of any suitable material or materials and cross section or sections. For example these side members are illustrated as flexible belts 30, 31 supported in and moved along the channels 28, 29. The rails 26, 27 have any suitable supports, as adjustable brackets 32 attached to the machine frame. The surfaces which carry side members 30, 31 are closer together at the feed end of the machine, than at the other end and though this effect can be variously produced the extent of divergence and the gage at each end may be adjusted by making the rails movable as by means of the brackets. Owing to the structure of the chain, its sides automatically spread as it moves—being relatively close together at the feed end and gradually diverging toward the other end.

Shaft 23 is shown in Fig. 2 mounted in a forked bracket 33 parts from which (see Fig. 1) project through frame slots 34. This allows of adjustment of the bracket and thus of the shaft to tension the chain but the said bracket is only one of the means obviously available for shaft adjustment.

The rim members 6 which extend between sides 30, 31 to form seatings may comprise wires which are shown curved (see Fig. 4) and sheathed by suitably soft material, as rubber tubing, the illustrated curves being suitable for flat apple grading. These rim members are riveted, linked, pivoted or otherwise attached to the sides, and have a medial connection which allows of the required spreading. Thus the members 6 are shown pivoted together at $6^a$, but other forms of jointing are usable to provide a series of enlargeable holes to cause articles to be graded.

The weight of any article seated over a grading hole during the chain motion insures that the side members 30, 31 spread apart so far as the divergence of guides 28, 29 allows. The closer these guides are the smaller the seatings. The invention is not restricted to the use of seatings of the form and details illustrated, the essential being that the grading or effective size of each seating shall progressively increase as the seating is conveyed along, each seating being self enlarging to a definite extent corresponding with its position. Thus each piece of fruit or article to be graded falls through the seating at the place indicated by its grade to the proper canvas compartment or other receiver.

The seating rim members 6 are shown as extending upward intermediately of the carrier sides so that the connection $6^a$ is elevated. As the sides spread apart the elevation becomes reduced.

Pieces of fruit or articles carried by the chain would if larger than the largest apertures the seats make, pass over the chain end as into compartment 5.

Although provision is preferred for adjusting the distances apart of rails 26, 27, and the pulleys to adjust the spread of sides 28, 29, some machines will be made with fixed gages.

A grading chain may be modified by providing it with more than one row of seatings.

The chain in Fig. 3 shows members so folded or bent together that the center appears well elevated, but in Fig. 4 the chain appears much flattened so that the center is lowered.

Seat rims shown as members jointed or attached to others may be integral with such others so long as flexibility or movability of parts is maintained to secure the described grading effect; leather, rubber and combinations containing these, are examples of materials which allow of such integral construction.

To allow of special attention to each piece of fruit or other article, or for greater simplicity of construction, any chain of the kind described could be hand fed. It is not necessary that every consecutive seating carry an article to be graded, nor that each seating be connected to any other. A space may exist between any two seatings.

Having described this invention what is claimed by Letters Patent is:—

1. In a device of the class described, a carrier comprising a pair of lengthwise extending flexible members, and a plurality of seat-forming elements carried by each of said members, the elements carried by one of the flexible members being connected to those of the other flexible member along the longitudinal center line of the carrier.

2. A carrier as set forth in claim 1, the connections between the seat-forming elements being flexible.

3. In a device of the class described, a carrier comprising a pair of lengthwise extending flexible members, and a plurality of pairs of seat-forming elements carried by each of said flexible members, the elements of each pair converging together at the longitudinal center line of the carrier.

4. A carrier as set forth in claim 3, the converging ends of the elements carried by one of the flexible members being flexibly connected with the converging end of those carried by the other flexible member.

5. In an apparatus of the class described, the combination with a carrier as set forth in claim 1, of a pair of divergent guide rails, and means for causing the flexible members to travel on said guide rails.

6. In an apparatus of the class described, the combination with a carrier as set forth in claim 1, of a pair of divergent guide rails, means for varying the divergence of said rails, and means for causing the flexible members to travel on said guide rails.

7. In an apparatus of the class described, the combination of a carrier comprising a pair of lengthwise extending flexible members, seat-forming elements secured to said flexible members, and means for causing the seat-forming elements of one flexible member to converge upwardly with those of the other flexible member at one end of the carrier, said convergence gradually decreasing toward the opposite end of the carrier.

In witness whereof I have hereunto set my hand.

NORMAN SINCLAIR McNAB.